(12) United States Patent
Hakalin et al.

(10) Patent No.: US 6,577,603 B1
(45) Date of Patent: Jun. 10, 2003

(54) METHOD FOR DETERMINING SPEED OF TERMINAL, AND RECEIVER

(75) Inventors: Petteri Hakalin, Oulu (FI); Kari Niemelä, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/269,942

(22) PCT Filed: Oct. 8, 1997

(86) PCT No.: PCT/FI97/00610
§ 371 (c)(1),
(2), (4) Date: Apr. 8, 1999

(87) PCT Pub. No.: WO98/16079
PCT Pub. Date: Apr. 16, 1998

(30) Foreign Application Priority Data

Oct. 9, 1996 (FI) ................................................. 964046

(51) Int. Cl.⁷ ................................................. H04J 1/16
(52) U.S. Cl. .................. 370/252; 370/329; 375/347; 455/441
(58) Field of Search ................................. 370/329–330, 370/347, 252, 331–338, 339; 455/449, 9, 446, 436–444; 375/347, 130–137; 342/461

(56) References Cited

U.S. PATENT DOCUMENTS

| | | | | |
|---|---|---|---|---|
| 4,696,027 A | * | 9/1987 | Bonta | 455/436 |
| 5,168,574 A | * | 12/1992 | Gordon et al. | 455/9 |
| 5,239,667 A | | 8/1993 | Kanai | 455/10 |
| 5,396,645 A | | 3/1995 | Huff | 455/441 |
| 5,585,805 A | | 12/1996 | Takenaka et al. | 342/461 |

FOREIGN PATENT DOCUMENTS

WO  WO 94/19704  9/1994

OTHER PUBLICATIONS

Simon Haykin, "An Introduction to Analog and Digital Communications", Chapter 10, pp. 539–567, 1989, John Wiley & Sons, Inc.*
Oct. 27, 1994, Doumi, et al., *Electronic Letters*, "Use of base station antenna diversity for mobile speed estimation", vol. 30, No. 22, pp. 1835–1836.

* cited by examiner

*Primary Examiner*—Hassan Kizou
*Assistant Examiner*—John Pezzlo
(74) *Attorney, Agent, or Firm*—Squire, Sanders & Dempsey LLP

(57) ABSTRACT

The invention relates to a method for determining speed of terminal in a radio system, and to a receiver in a radio system, the receiver comprising means for taking samples from a received signal at given intervals, means for determining a signal instantaneous strength by measuring a signal strength of each sample, and means for calculating a mean strength for a sampled signal within a given time window. For preferably determining the terminal speed the receiver of the invention comprises the means for comparing instantaneous strength values with a calculated mean strength and for calculating how frequently an instantaneous strength moves above or below a mean value within the given time window, and the means for determining an apparatus speed based on the number of transitions.

7 Claims, 3 Drawing Sheets

METHOD FOR DETERMINING SPEED OF TERMINAL, AND RECEIVER

FIELD OF THE INVENTION

The invention relates to a method for determining speed of terminal in a radio system, the method comprising sampling from a received signal at given intervals, calculation of a channel impulse response on the basis of the received signal and determination of a channel impulse response energy, and calculating a mean strength for a sampled signal within a given time window.

BACKGROUND OF THE INVENTION

The present invention is applicable particularly to cellular radio systems and to other digital radio systems too, where terminals communicating with base stations moves across cell limits. Information about the moving speed of the terminal substantially facilitates the radio system resource management such as handover anticipation and power control optimization.

It is preferable, for example, in a system using small microcells and with them larger overlapping so-called umbrella cells that fast moving terminals communicate with the umbrella cells and slow moving or stationary terminals with the smaller microcells. In this way the number of handovers needed and the signalling load of the network can be decisively reduced.

In a typical cellular radio environment the signals between a base station and a subscriber terminal propagate on several routes between a transmitter and a receiver. This multipath propagation is mainly caused by signal reflections from surrounding surfaces. Signals travelling on different routes arrive at the receiver at different times owing to a different propagation delay. This holds true for both transmission directions. The multipath propagation of a signal can be monitored in a receiver by measuring the impulse response of the received signal, signals arriving at different times being visible as peaks proportional to their signal strength.

A known solution for determining speed of a moving terminal is to monitor the Doppler shift of the carrier wave frequency. However, this method is impractical as it requires a stable frequency reference source which is very expensive.

Another known method is described in the article by Doumi, T., Gardiner, J. G.: Use of base station diversity for mobile speed estimation, Electronic Letters, Vol. 30, no. 22, pp. 1835–1836. Base station antenna diversity is utilized in the method of the publication. The antenna providing the strongest signal level is always selected in diversity. An antenna duplex frequency is proportional to the Doppler shift on the basis of which an apparatus speed can be determined.

A method for measuring the apparatus speed when using antenna diversity is described in patent publication U.S. Pat. No. 5,396,645. In the method of the publication the received signal strength fluctuations are measured in connection with antenna diversity.

SUMMARY OF THE INVENTION

An object of the present invention is to enable terminal speed measuring without antenna diversity using a relatively simple and advantageous equipment.

This is achieved with the method of the type set forth in the preamble characterized by determining a mean energy of several consecutive calculated channel impulse responses, comparing instantaneous impulse response strength values with a calculated mean strength, and calculating how frequently an instantaneous strength moves above or below a mean value within a given time window, and by determining an apparatus speed on the basis of the number of transitions.

The invention also relates to a method for determining speed of terminal in a radio system, the method comprising the use of antenna diversity in signal reception, sampling from a received signal at given intervals, the determination of a signal instantaneous strength by measuring a signal strength of each sample, and calculating a mean strength for a sampled signal within a given time window in each diversity branch. The method of the invention is characterized by comparing instantaneous strength values with the calculated mean strength in each diversity branch and by calculating how frequently the instantaneous strength moves above or below a mean value within the given time window, and by determining an apparatus speed in each diversity branch on the basis of the number of transitions and by selecting as a speed value the speed value given by the diversity branch offering the best signal quality.

The invention further relates to a receiver in a radio system, the receiver comprising means for receiving a terminal signal with at least two diversity antennas, means for sampling a received signal at given intervals, means for determining a signal instantaneous strength by measuring a signal strength of each sample and means for calculating a mean strength for a sampled signal within a given time window, and means for determining the signal quality received by each antenna. The receiver of the invention is characterized by the receiver comprising means for comparing instantaneous strength values with a calculated mean strength and for calculating how frequently an instantaneous strength moves above or below a mean value within the given time window, means for determining an apparatus speed in each diversity branch, and means for determining the apparatus speed based on the number of transitions in each diversity branch and means for selecting as a speed value to be utilized the speed value given by the diversity branch offering the best signal quality.

The solution of the invention has several advantages. The method of the invention enables the fast enough estimation of the moving station speed as far as handover is concerned. The use of antenna diversity is not necessary for utilizing the invention, although the invention functions also in connection with diversity.

In order to avoid error measuring caused by signal noise a threshold value can be used in connection with the mean strength value in such a manner that when the instantaneous strengths are compared with the mean value the transition is not taken into account until the instantaneous value has moved across the mean value by a certain determined threshold value.

BRIEF DESCRIPTION OF THE DRAWINGS

In the following, the invention will be described in greater detail with reference to examples in the accompanying drawings, in which.

DETAILED DESCRIPTION OF THE PREFERRED EMBODIMENTS

Figure 1:
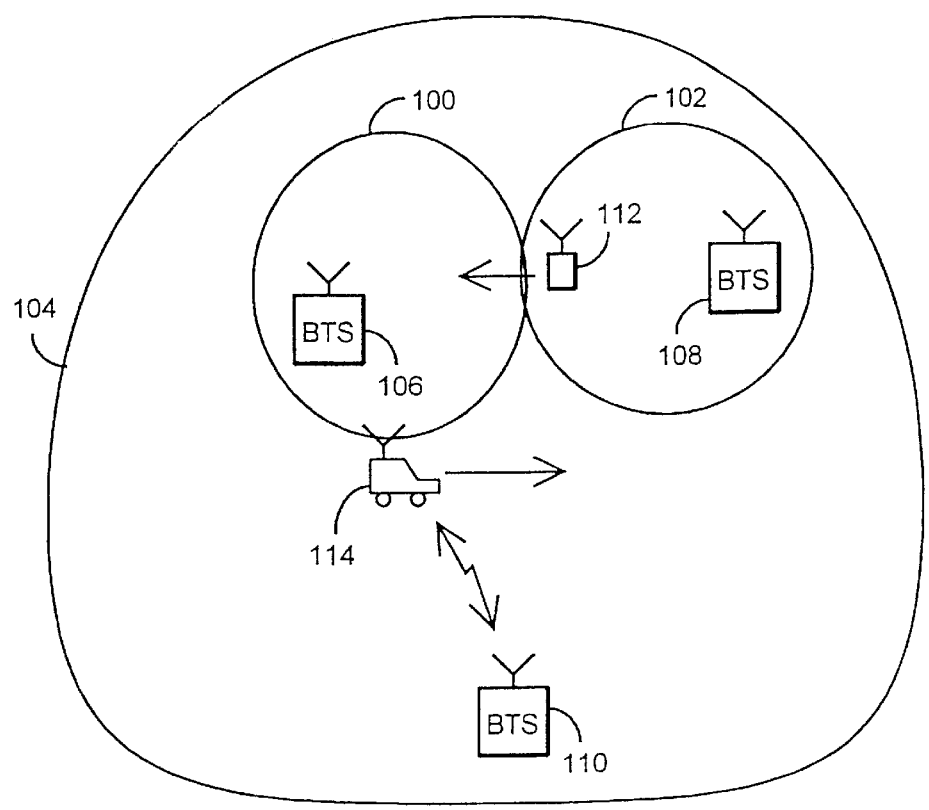
FIG. 1 illustrates an example of a cellular radio system in which the method of the invention can be implemented.

FIG. 1 illustrates an example of a part of a cellular radio system in which the method of the invention can be implemented. A number of small so-called microcells 100–102 and a big overlapping umbrella cell 104 are shown in the Figure. Each cell is typically served by its own base station equipment 106–110. The microcells are intended for slow moving or stationary terminals 112, such as the ones for pedestrian users. The umbrella cell, in turn, serves fast moving terminals 114 which are mounted, for example, in vehicles. Determining cell moving speed is important in order to keep the terminals in the right type of cells. It should be noted that the method of the invention can naturally also be applied to such radio systems in which overlapping microcells and umbrella cells are not yet used.

When a terminal communicating with a base station moves, then the signal strength received by the base station from the terminal varies owing to fast fading. Let us examine FIG. 2 which illustrates by way of example the effect of fast fading with two different terminal speeds. Time is on a horizontal axis 200 of the Figure and the envelope strength is on a vertical axis 202. The Figure shows the Rayleigh-faded envelope of the received signal when the terminal moves 5 km/h (204) and 50 km/h (206). The number of fades is larger at a fast moving terminal than at a slow moving terminal.

In the method of the invention samples are taken according to prior art from the received signal at given intervals. A signal strength is determined for each sample and a mean strength is further calculated for the received signal e.g. by averaging the signal strengths of the samples within the given time window. The averaging window can be for instance 0.5 seconds. When the invention is applied to a TDMA system a sample indicating the mean signal strength can be taken from each time slot and it can be compared with the calculated mean value of several time slots. In the TDMA system the sampling can be implemented e.g. in such a manner that several samples (for example four) are taken from each received bit, and from the midpoint of the time slot the mean is calculated for example using 32 bits equalling the instantaneous signal strength in said time slot.

Figure 2:
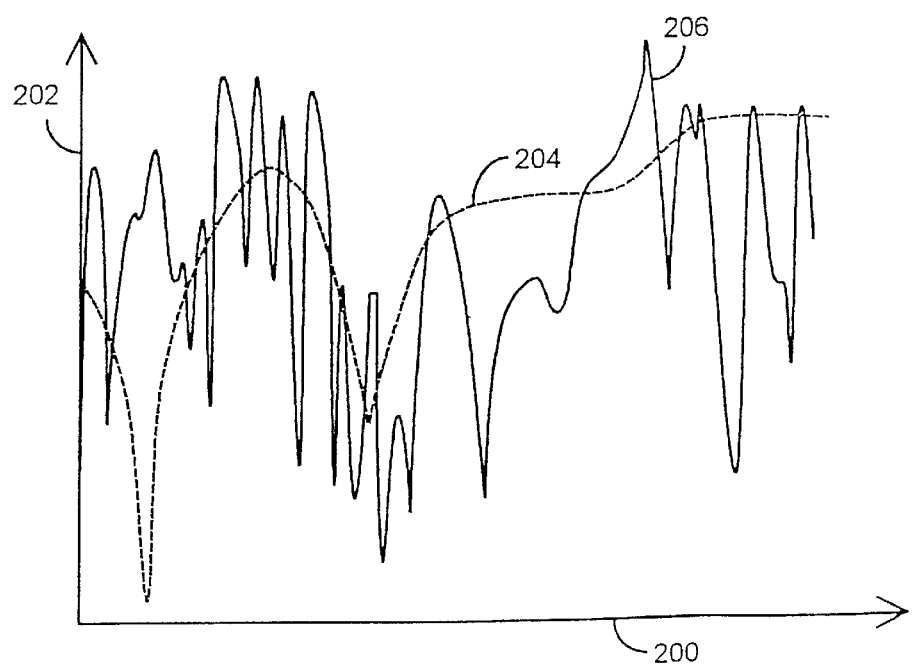
FIG. 2 illustrates how fast fading functions at different speeds.

The fluctuation of the envelope formed by the instantaneous strength values of the signal and whose typical shape is illustrated by way of example in FIG. 2, is compared with the calculated mean strength. The envelope varies above and below the mean. It is calculated in the solution of the invention, how often the instantaneous strength moves above or below the mean value within a previously given time window. The number of such transitions is directly proportional to the terminal speed.

Figure 3A:
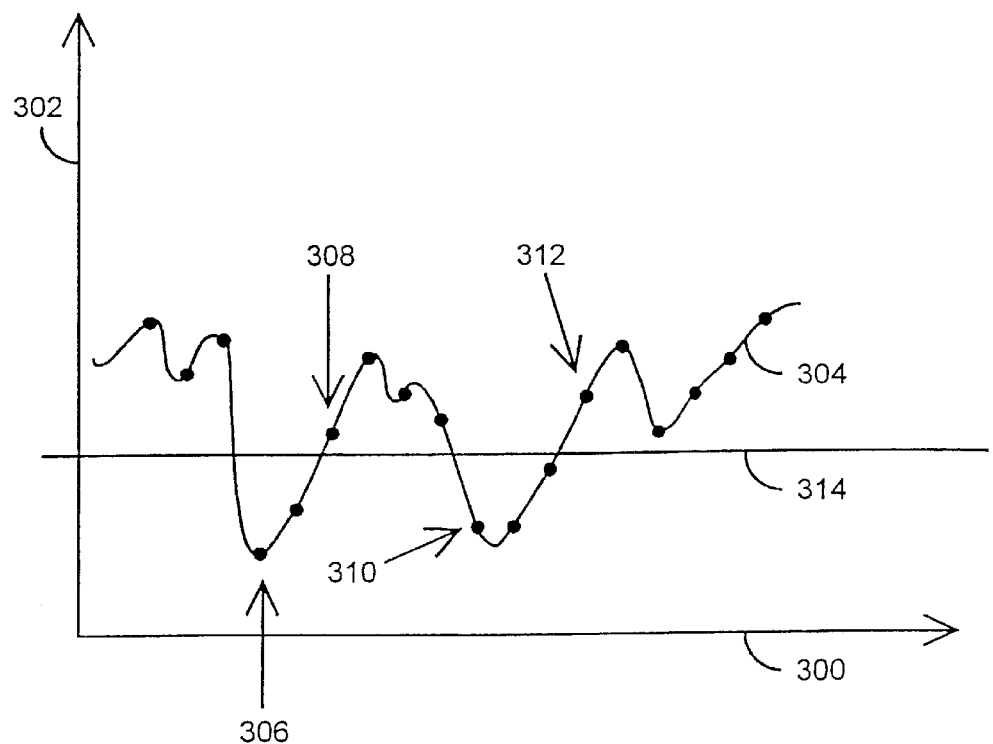
FIGS. 3a and 3b illustrate an example of the method of the invention and FIGS. 4 and 5 illustrate examples of the structure of the receiver of the invention.

The method is illustrated in FIG. 3a. Time is on the horizontal axis 300 and the envelope strength is on the vertical axis 302 in the Figure. The Figure shows a Rayleigh faded received signal envelope 304 from which samples have been taken at regular intervals, the samples denoted by black circles in the Figure. A calculated signal mean strength 314 at the given time slot is further denoted in the Figure. The envelope 304 varies above and below the mean 314. It is observed at samples 306, 308, 310 and 312 that the transition has taken place. The speed of the apparatus that has transmitted the signal can be derived from the number of transitions per time unit.

Figure 3B:
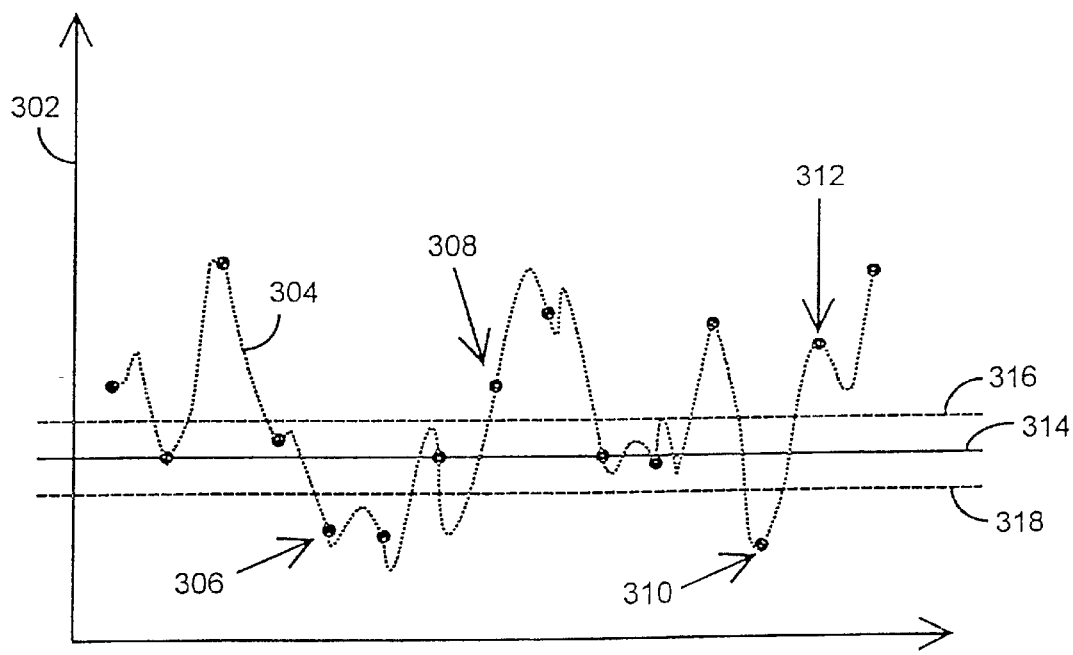

There is always random noise, varying in quantity, upon signal transmission. It becomes more difficult to reliably determine transitions when noise increases in the signal. In the solution of the invention errors caused by noise can be reduced using threshold values around the mean value of the signal. Thus, when the instantaneous strengths are compared with the mean value, the transition is not taken into account until the instantaneous value has moved across the mean value by a certain determined threshold value. This is illustrated in FIG. 3b. As above, time is on the horizontal axis 300 and the envelope strength is on the vertical axis 302 in the Figure. The Figure shows the Rayleigh faded received signal envelope 304 from which samples have been taken at regular intervals, the samples denoted by black circles. The calculated signal mean strength 314 within the given time slot has further been denoted in the Figure. When transitions are calculated, threshold values 316, 318 are taken into account, by which amount the signal has to exceed the mean before the transition has been taken into account.

The method of the invention is applicable when antenna diversity is used. In connection with antenna diversity the receiver receives the signal using two or more antennas and the signals of different diversity branches can be combined using a desired method. There are many alternatives of the invention for measuring terminal speed in connection with diversity. A preferable alternative for implementation is to determine an apparatus speed in each diversity branch and to select as a speed value to be utilized the speed value given by the diversity branch offering the best signal quality. Another alternative is to select as the speed value to be utilized the speed value combined from measuring results in accordance with diversity branch signal quality.

The method of the invention is also applicable in such a manner that channel impulse response energy is used when terminal speed is determined. Channel impulse response is generally calculated on the basis of the received signal and this is used for eliminating transmission errors in the channel. The energies of multi-path propagated signal components are shown in the impulse response as the function of delay. The impulse response can be determined using methods known to those skilled in the art. If the energies of all impulse response taps are added up a value is obtained that is directly proportional to the power of the received burst. Thus, the energy of the channel impulse response is determined and the mean strength of the sampled signal within the given time window is calculated in the solution of the invention. Furthermore, the mean energy of several consecutive calculated channel impulse responses is determined.

The instantaneous impulse response strength values are compared with the calculated mean strength, and calculation on how often the instantaneous strength moves above or below the mean value within the given time window is performed. The terminal speed is determined based on the number of transitions. Antenna diversity can be utilized in this alternative too.

Figure 4:
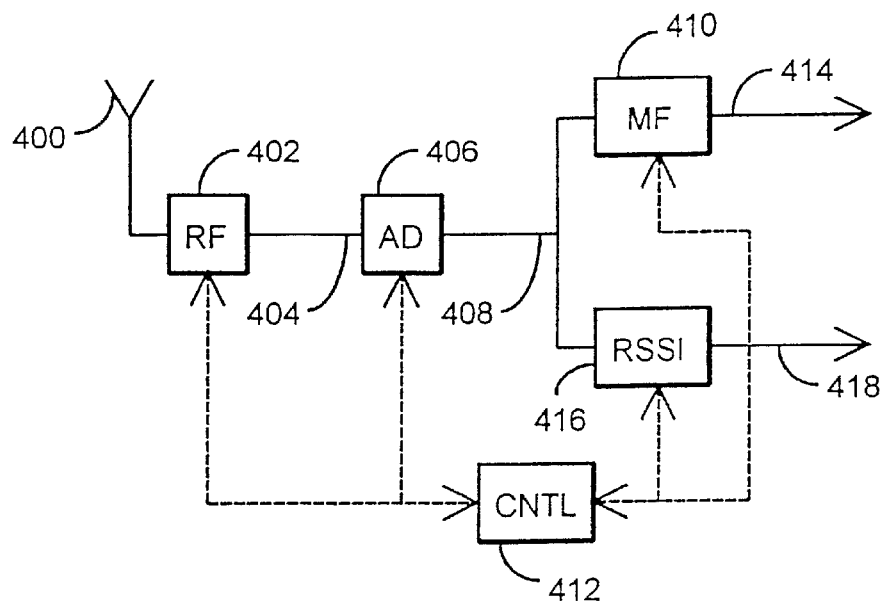

Let us next examine the receiver structure of the invention. An example of the receiver of the invention is illustrated with relevant parts in FIG. 4 using a block diagram. The receiver comprises an antenna 400 using which the received signal is conveyed to radio frequency parts 402 in which the signal is converted into intermediate frequency. A converted signal 404 is conveyed to sampling means 406 in which samples are taken from the signal at desired intervals. The described parts can be implemented using manners known to those skilled in the art. A sampled signal 408 is further conveyed to a matched filter 410 indicating the signal quality, and to calculation means 416 determining the signal strength. A signal 414, 418 is further conveyed from both blocks to the other parts of the receiver. The receiver also comprises a control block 412 which controls the function of the different parts of the receiver and performs the necessary calculation.

Thus, the receiver of the invention comprises means 416 for determining the signal instantaneous strength by measuring the signal strength of the signal samples, and means 412, 416 for calculating the signal mean strength within the given time window. When a TDMA receiver is concerned samples can be taken in each time slot and the mean can be calculated from several time slots. The receiver further comprises the means 412 for comparing the instantaneous strength values with the calculated mean strength and for calculating how often the instantaneous strength moves above or below the mean value within the given time window, and the means 412 for determining the apparatus speed based on the number of transitions. The control and calculation means 412 and 416 can be implemented using a signal or a general processor, or alternatively using separate components. Typically the method of the invention can be implemented for example at the base station receiver of the cellular radio system using software.

Figure 5:
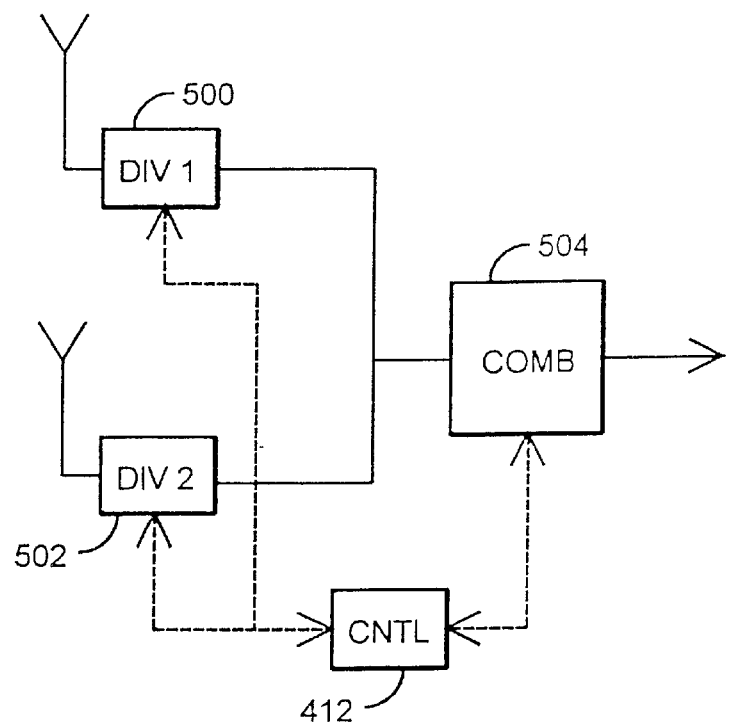

FIG. 5 illustrates another example of the receiver of the invention. It concerns a diversity receiver comprising means 500, 502 for receiving terminal signal using two diversity antennas, and means 504 for preferably combining the signals received by different antennas. The Figure shows two diversity branches, the number of which may naturally vary. The receiver of the invention comprises the means 500, 502 for determining the apparatus speed in each diversity branch and the means 412, 500, 502 for determining the signal quality received by each antenna and the means 412 for selecting as the speed value to be utilized the speed value given by the diversity branch offering the best signal quality. The internal structure of each diversity branch is similar to the structure of the single branch receiver described above. Thus, for example, the signal quality information is obtained from means 410. The receiver of the invention comprises other prior art components too, such as filters, as is known to those skilled in the art, but as irrelevant parts for the present invention have not been explained here.

Even though the invention has been explained above with reference to the example of the accompanying drawings, it is obvious that the invention is not restricted to it but can be modified in various ways within the scope of the inventive idea disclosed in the attached claims.

What is claimed is:

1. A method for determining speed of terminal in a radio system, the method comprising:
   sampling from a received signal at given intervals;
   calculating a channel impulse response on a basis of the received signal;
   determining a channel impulse response energy;
   calculating a mean strength value for a sampled signal with a given time window;
   determining a mean energy of several consecutive calculated channel impulse responses;
   comparing instantaneous impulse response strength values with a calculated mean strength value;
   calculating how frequently an instantaneous strength moves above or below the mean strength value within a given time window;
   determining an apparatus speed based on a number of transitions; and
   ascertaining that a transition has not taken place until an instantaneous strength value has moved across the mean strength value by a certain determined threshold value by comparing the instantaneous strength values with the mean strength value.

2. The method according to claim 1, further comprising:
   using antenna diversity in signal reception;
   determining the apparatus speed in each diversity branch; and
   selecting as a speed value to be utilized the speed value given by a diversity branch offering a best signal quality.

3. The method according to claim 2, further comprising:
   determining the apparatus speed in each diversity branch; and
   selecting as the speed value to be utilized the speed value combined from measuring results in accordance with the signal qualities of the diversity branches.

4. A method for determining speed of terminal in a radio system, the method comprising:
   using antenna diversity in signal reception;
   sampling from a received signal at given intervals;
   measuring a signal strength of each sampled signal to determine an instantaneous signal strength;
   calculating a mean strength for the sampled signal within a given time window in each diversity branch;
   comparing instantaneous strength values with the calculated mean strength in each diversity branch;
   calculating how frequently the instantaneous strength moves above or below a mean value within a given time window;
   determining an apparatus speed in each diversity branch on a basis of a number of transitions;
   ascertaining that a transition has not taken place until an instantaneous strength value has moved across the mean value by a certain determined threshold value by comparing the instantaneous strength values with the mean value; and
   selecting as a speed value the speed value given by the diversity branch offering the best signal quality.

5. The method according to claim 4, further comprising;
   using a TDMA method in the radio system;
   determining the instantaneous signal strength for each time slot separately; and
   comparing the instantaneous value of each time slot with the mean signal strength calculated over several time slots.

6. The method according to claim 4, further comprising:
   determining the apparatus speed in each diversity branch; and
   selecting as the speed value to be utilized the speed value combined from measuring results in accordance with the signal qualities of the diversity branches.

7. A receiver in a radio system, the receiver comprising:
   means for receiving a terminal signal with at least two diversity antennas;
   means for sampling a received signal at given intervals;
   means for determining a signal instantaneous strength by measuring a signal strength of each sample;
   means for calculating a mean strength for a sampled signal within a given time window;
   means for determining the signal quality received by each antenna;
   means for comparing instantaneous strength values with a calculated mean strength and for calculating how frequently the instantaneous strength moves above or below a mean value within the given time window;
   means for determining an apparatus speed in each diversity branch;
   means for ascertaining that a transition has not taken place until an instantaneous strength value has moved across the mean value by a certain determined threshold value by comparing the instantaneous strength values with the mean value; and means for determining the apparatus speed based on the number of transitions in each diversity branch and means for selecting as a speed value to be utilized the speed value given by the diversity branch offering the best signal quality.

* * * * *